(12) United States Patent
Chun et al.

(10) Patent No.: US 8,582,506 B2
(45) Date of Patent: Nov. 12, 2013

(54) METHOD OF TRANSMITTING AND RECEIVING HARQ FEEDBACK, AND MOBILE STATION AND BASE STATION APPARATUS USING THE SAME METHOD

(75) Inventors: Jin Young Chun, Anyang-si (KR); Bin Chul Ihm, Anyang-si (KR)

(73) Assignee: LG Electronics Inc., Seoul (KR)

(*) Notice: Subject to any disclaimer, the term of this patent is extended or adjusted under 35 U.S.C. 154(b) by 167 days.

(21) Appl. No.: 13/203,887

(22) PCT Filed: Feb. 26, 2010

(86) PCT No.: PCT/KR2010/001234
§ 371 (c)(1),
(2), (4) Date: Aug. 30, 2011

(87) PCT Pub. No.: WO2010/101375
PCT Pub. Date: Sep. 10, 2010

(65) Prior Publication Data
US 2012/0020299 A1    Jan. 26, 2012

Related U.S. Application Data

(60) Provisional application No. 61/156,533, filed on Mar. 1, 2009, provisional application No. 61/158,400, filed on Mar. 9, 2009.

(30) Foreign Application Priority Data

Feb. 26, 2010  (KR) .................... 10-2010-0017751

(51) Int. Cl.
*G01R 31/08*    (2006.01)
(52) U.S. Cl.
USPC ........................................................ 370/328

(58) Field of Classification Search
None
See application file for complete search history.

(56) References Cited

U.S. PATENT DOCUMENTS

| 7,054,936 B2 * | 5/2006 | El Batt et al. ................ 709/226 |
| 7,924,935 B2 * | 4/2011 | Tong et al. .................... 375/267 |
| 8,018,916 B2 * | 9/2011 | Venkatachalam et al. .... 370/349 |
| 2006/0195767 A1 * | 8/2006 | Ihm et al. ...................... 714/776 |
| 2008/0168321 A1 | 7/2008 | Lim et al. |
| 2008/0247349 A1 | 10/2008 | Hsieh et al. |
| 2012/0020299 A1 * | 1/2012 | Chun et al. .................... 370/328 |

FOREIGN PATENT DOCUMENTS

| EP | 1 876 747 | 1/2008 |
| KR | 2008-0079630 | 9/2008 |
| KR | 2008-0090353 | 10/2008 |
| KR | 10-0876728 B | 12/2008 |

OTHER PUBLICATIONS

International Search Report for PCT/KR2010/001234 (PCT corresponding to present application).

* cited by examiner

*Primary Examiner* — Robert Wilson
(74) *Attorney, Agent, or Firm* — Morgan, Lewis & Bockius LLP

(57) ABSTRACT

A method for transmitting and receiving a hybrid automatic repeat request (HARQ) feedback, and a mobile station and a base station using the same are disclosed. A method for allowing a mobile station to transmit a HARQ feedback in a wireless communication system includes receiving two downlink bursts or one downlink burst including two codewords from a base station, and transmitting an ACK/NACK feedback corresponding to either each downlink burst of the received two downlink bursts or each codeword of one downlink burst including the two codewords to the base station. An orthogonal sequence is applied to the ACK/NACK feedback of the mobile station so that the resultant ACK/NACK feedback is transmitted via a first HARQ feedback channel (HFBCH) included in a single HARQ mini tile (HMT).

8 Claims, 7 Drawing Sheets

☐ Region of HFBCHs
▨ HFBCH for 1-bit feedback of a burst
▩ HFBCH for multiple-bit feedback of a burst ☐ Region of HFBCHs
▨ HFBCH for 1-bit feedback of a burst
▬ HFBCH for multiple-bit feedback of bursts Region of HFBCHs
 HFBCH for 1-bit feedback of a burst
 HFBCH for multiple-bit feedback of a burst

METHOD OF TRANSMITTING AND RECEIVING HARQ FEEDBACK, AND MOBILE STATION AND BASE STATION APPARATUS USING THE SAME METHOD

This application is a national stage application of PCT Application No. PCT/KR2010/001234, filed on Feb. 26, 2010, which claims the benefit of U.S. Provisional Application Nos. 61/156,533, filed on Mar. 1, 2009, and 61/158,400, filed Mar. 9, 2009. The present national stage application also claims the benefit of Korean Patent Application No. 10-2010-0017751, filed Feb. 26, 2010.

TECHNICAL FIELD

The present invention relates to a wireless communication system, and more particularly to a hybrid automatic repeat request (HARQ) feedback.

BACKGROUND ART

In a wireless communication system, a variety of errors are inherent to radio frequency (RF) signal propagation over the air interface, thus making data transmission difficult. Because a radio frequency (RF) channel experiences multi-path fading, path loss that becomes serious as a mobile station (MS) is further from a Base Station (BS), etc. as well as thermal noise modeled as Additive White Gaussian Noise (AWGN), it is more difficult to transmit a signal reliably.

To ensure transmission reliability against various changes in channel status and errors during wireless communications, techniques such as 1) Forward Error Correction (FEC) or channel coding, and 2) Automatic Repeat reQuest (ARQ) or Hybrid Automatic Repeat reQuest (HARQ) are widely used.

Among them, HARQ will be described in brief.

FIG. 1 illustrates a signal flow referred to for describing the principle of HARQ.

Referring to FIG. 1, HARQ is a hybrid technology of conventional schemes in combination, that is, ARQ in the Medium Access Control (MAC) layer and channel coding in the physical layer. In HARQ, an erroneous initial transmission packet P1A is stored until a retransmission signal P1B is received because the initial transmission packet P1A retains information to a certain extent despite errors, and decoded after being soft-combined with the retransmission signal P1B or along with the retransmission signal P1B without soft combining.

The initial transmission signal P1A and the retransmission signal P1B are the same or different transmission packets created from the same channel encoder input packet P1. A packet P2A is produced from a new channel encoder input packet P2.

Although data has been transmitted according to the scheduling standard, the data may be unexpectedly lost or damaged during the transmission process. In this case, there are proposed a variety method for controlling the faulty or erroneous operation, for example, an automatic repeat request (ARQ) scheme and a HARQ scheme, etc. The ARQ scheme waits for transmission of the acknowledgement (ACK) signal after transmitting a single frame. If a receiver correctly receives data of the frame, it transmits the ACK signal. However, if an unexpected error occurs in the frame, the receiver transmits a negative-ACK (NACK) signal, and deletes the received erroneous frame from its own buffer. If the transmitter receives the ACK signal, it transmits the next frame. Otherwise, if the transmitter receives the NACK signal, it retransmits the frame. Differently from the ARQ scheme, the HARQ scheme allows the receiver to transmit the NACK signal to the transmitter on the condition that the received frame cannot be demodulated. However, the HARQ scheme does not delete the pre-received frame from the buffer, and stores the same in the buffer for a predetermined period of time. Therefore, if the above-mentioned frame is retransmitted, the HARQ scheme combines the pre-received frame with a retransmitted frame, and increases the success rate of data reception.

In recent times, the HARQ scheme has been more widely used than the ARQ scheme. There are various kinds of HARQ schemes. Likewise, if the receiver has failed in decoding reception (Rx) data, it can transmit the HARQ feedback signal (ACK/NACK) to the base station.

However, information indicating which channel will be used for a specific mobile station to be used for transmission of a feedback signal (i.e., ACK/NACK) in association with one or more downlink bursts, and other information indicating a method for transmitting such a feedback signal on the condition that multiple codewords are applied to one downlink burst have not been investigated yet. In addition, under a wireless communication environment involving a plurality of mobile stations, information indicating a method for constructing HARQ feedback channel (HFBCH) transmitted from each mobile station and another information indicating whether to transmit the constructed HARQ feedback channel (HFBCH) to the base station have also not been investigated yet.

DISCLOSURE OF INVENTION

Technical Problem

Accordingly, the present invention is directed to a method for transmitting and receiving HARQ feedback, and a mobile station and a base station using the same method, that substantially obviate one or more problems due to limitations and disadvantages of the related art.

Solution to Problem

An object of the present invention is to provide a method for transmitting and receiving HARQ feedback.

Another object of the present invention is to provide a mobile station for transmitting HARQ feedback.

Another object of the present invention is to provide a base station for receiving HARQ feedback.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a hybrid automatic repeat request (HARQ) feedback at a mobile station (MS) in a wireless communication system includes receiving two downlink bursts or one downlink burst including two codewords from a base station (BS); and transmitting an ACK/NACK feedback, corresponding to each downlink burst of the received two downlink bursts or each codeword of the received one downlink burst including the two codewords, to the base station, wherein an orthogonal sequence is applied to the ACK/NACK feedback of the mobile station so that the resultant ACK/NACK feedback is transmitted via a first HARQ feedback channel (HFBCH) included in a single HARQ mini tile (HMT).

The first HARQ feedback channel (HFBCH) for the ACK/NACK feedback transmission of the mobile station and a second HARQ feedback channel (HFBCH) for an ACK/NACK feedback transmission of another mobile station may be included in the single HARQ mini tile (HMT), and transmitted to the base station.

The first and second HARQ feedback channels (HFBCHs) may be located in each of three HARQ mini tiles (HMTs) each including the single HARQ mini tile (HMT).

Each of the three HARQ mini tiles (HMTs) may be arranged in such a manner that a time region and a frequency region are not overlapped with each other.

The single HARQ mini tile (HMT) may include two contiguous orthogonal frequency division multiplexing (OFDM) symbols on a time axis and two contiguous subcarriers on a frequency axis.

The mobile station and another mobile station may respectively use a first orthogonal sequence and a second orthogonal sequence for ACK/NACK feedback transmission, wherein a code division multiplexing (CDM) scheme is applied to the first orthogonal sequence and the second orthogonal sequence within one HARQ mini tile (HMT).

Each of the mobile station and another mobile station may transmit ACK/NACK feedback having the size of 2 bits to the base station.

In another aspect of the present invention, a method for receiving a hybrid automatic repeat request (HARQ) feedback at a base station (BS) in a wireless communication system includes transmitting, by the base station, two downlink bursts or one downlink burst including two codewords to each of a first and a second mobile station, and receiving an ACK/NACK signal, corresponding to each downlink burst of the transmitted two downlink bursts or each codeword of the transmitted one downlink burst including the two codewords, from each of the first and second mobile stations, wherein different orthogonal sequences, that is, a first orthogonal sequence and a second orthogonal sequence, are applied to respective ACK/NACK signals of the first and second mobile stations, and the resultant ACK/NACK signals are transmitted via different feedback channels, that is, a first HARQ feedback channel (HFBCH) and a second HARQ feedback channel (HFBCH), included in a single HARQ mini tile (HMT).

In another aspect of the present invention, a mobile station (MS) for transmitting a hybrid automatic repeat request (HARQ) feedback in a wireless communication system includes a reception module for receiving two downlink bursts or one downlink burst including two codewords from a base station (BS), and a transmission module for transmitting an ACK/NACK feedback corresponding to either each downlink burst of the received two downlink bursts or each codeword of the received one downlink burst including the two codewords to the base station, wherein an orthogonal sequence is applied to the ACK/NACK feedback of the mobile station so that the resultant ACK/NACK feedback is transmitted via a first HARQ feedback channel (HFBCH) included in a single HARQ mini tile (HMT).

In another aspect of the present invention, a base station (BS) for receiving a hybrid automatic repeat request (HARQ) feedback in a wireless communication system includes a transmission module for transmitting two downlink bursts or one downlink burst including two codewords to each of a first and a second mobile station, and a reception module for receiving an ACK/NACK signal, corresponding to each downlink burst of the transmitted two downlink bursts or each codeword of the transmitted one downlink burst including the two codewords from each of the first and second mobile stations, wherein different orthogonal sequences, that is, a first orthogonal sequence and a second orthogonal sequence, are applied to respective ACK/NACK signals of the first and second mobile stations, and the resultant ACK/NACK signals are transmitted via different feedback channels, that is, a first HARQ feedback channel (HFBCH) and a second HARQ feedback channel (HFBCH), included in a single HARQ mini tile (HMT).

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

It is to be understood that both the foregoing general description and the following detailed description of the present invention are exemplary and explanatory and are intended to provide further explanation of the invention as claimed.

Advantageous Effects of Invention

According to a first method for transmitting HARQ feedback of 2 bits (i.e., 2-bit HARQ feedback), each mobile station can use the entirety of power allocated to one HARQ feedback channel (HFBCH), such that the accuracy of HARQ feedback transmission can be increased and communication performance or throughput can also be improved.

In addition, compared with a second method for transmitting HARQ feedback of one bit (i.e., 1-bit HARQ feedback), the above-mentioned first method for transmitting 2-bit HARQ feedback maintains the same capacity as in the second method, and uses the same indexing rule as in the second method, resulting in no indication overhead.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as an Institute of Electrical and Electronics Engineers (IEEE) 802.16 system, but the present invention is not limited thereto and the remaining parts of the present invention other than unique characteristics of the IEEE 802.16 system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS), and an advanced mobile station (AMS) and the like. Also, the base station (BS) may refer to an arbitrary node of a network end which communicates with the above terminal, and may include a Node B (Node-B), an eNode B (eNode-B), and an access point (AP) and the like. The term "module" refers to hardware.

In a mobile communication system, the MS may receive information from the base station (BS) via a downlink, and may transmit information via an uplink. The information that is transmitted and received to and from the MS includes data and a variety of control information. There are a variety of physical channels according to categories of transmission (Tx) and reception (Rx) information of the MS.

Next, a method for transmitting an acknowledgement (ACK)/Negative ACK (ACK/NACK) signal for a downlink burst at each mobile station to a base station will hereinafter be described.

Figure 1:
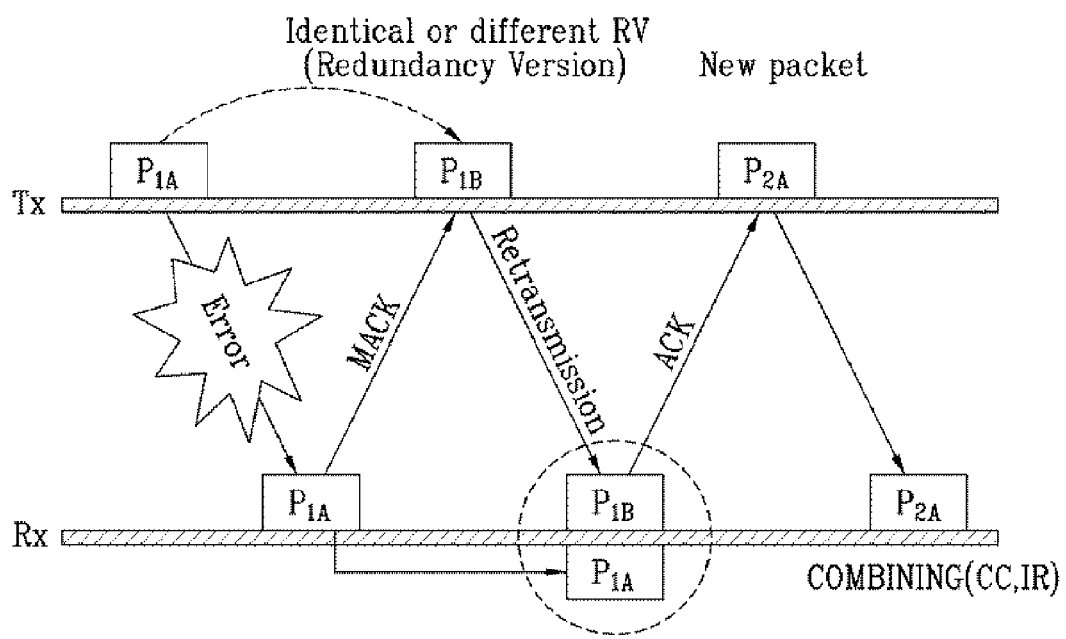
FIG. 1 is a conceptual diagram illustrating a general MIMO communication system.
Figure 2:
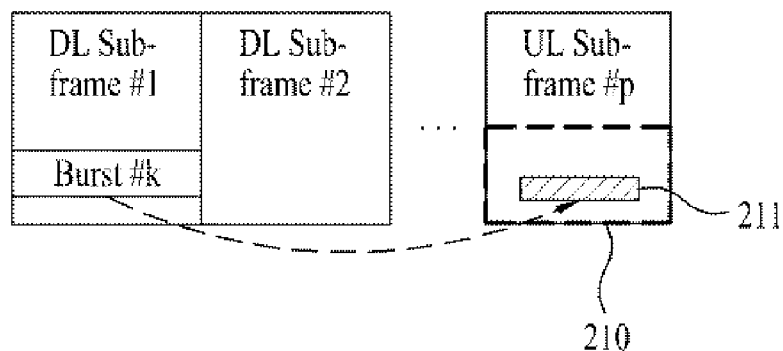
FIG. 2 illustrates an example of a frame structure used when a mobile station applies 1-bit feedback to each of received downlink bursts according to the present invention.

FIG. 2 illustrates an example of a frame structure used when a mobile station applies 1-bit feedback to each of received downlink bursts according to the present invention.

Referring to FIG. 2, a mobile station may receive one downlink burst through a specific downlink subframe (subframe index #1) from a base station. In this case, the mobile station may inform the base station of information (ACK/NACK signal) indicating whether the downlink burst received from the base station has been received without any errors. In more detail, the mobile station may transmit information of one bit (i.e., 1-bit information) to the base station via an uplink control channel (e.g., a HARQ FeedBack CHannel (HFBCH)) or the like, such that the mobile station can recognize whether one downlink burst received through a specific downlink subframe (subframe index #1) from the base station has been received without any errors.

Referring to FIG. 2, the mobile station may transmit the ACK/NACK signal of one bit to the base station through a specific region 211 within a predetermined HARQ feedback channel (HFBCH) region 210 in an uplink subframe having an index 'p' (i.e., uplink subframe #p).

Figure 3:
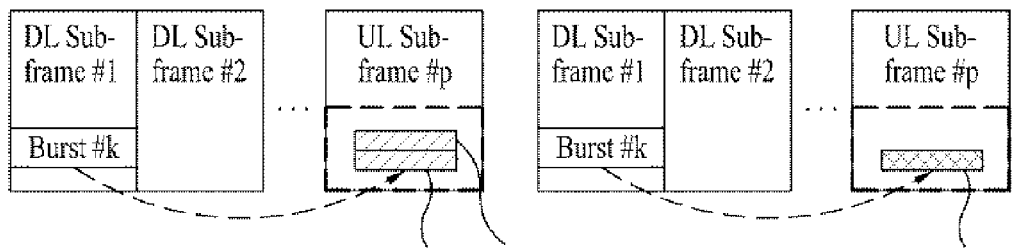
FIG. 3 illustrates an example of a frame structure used when a mobile station applies predetermined bits ? feedback to each of received downlink bursts according to the present invention.

FIG. 3 illustrates an example of a frame structure used when a mobile station applies predetermined bits ? feedback to each of received downlink bursts according to the present invention.

One downlink burst may use multiple codewords (MCW). If the mobile station receives a downlink burst to which several codewords are applied from the base station, an ACK/NACK signal indicating whether each codeword has been received without any errors may be transmitted to the base station. Therefore, in this case, it is necessary for the mobile station to transmit an ACK/NACK signal of two or more bits to the base station. For example, if one downlink burst includes two codewords, the mobile station may transmit the ACK/NACK signal having the size of 2 bits to the base station.

In addition, in order to support a multi-hop relay in a multi-hop relay system, it is necessary for a relay station to discriminate between ACK and NACK signals. In order to allow each relay station to discriminate between the ACK signal and the NACK signal, it is necessary to transmit the HARQ ACK/NACK signal of two or more bits.

Referring to FIGS. 3(*a*) and 3(*b*), the mobile station may receive one downlink burst including multiple codeword through a specific downlink subframe (subframe index #1) from the base station, and then may transmit an HARQ feedback information to the base station via an HFBCH or the like, the HARQ feedback information indicates whether each codeword in the one downlink burst have been received without any errors. As described above, the mobile station may transmit an ACK/NACK signal corresponding to each codeword in one downlink burst to which MCW is applied.

In this case, as shown in FIG. 3(*a*), the mobile station may assign different channels 310 and 320 to respective codewords each having one bit (1 bit), and transmit the respective 1-bit codewords to the base station through such channels 310 and 320. As shown in FIG. 3(*b*), the mobile station may transmit 2-bit ACK/NACK signals corresponding to respective codewords to the base station through one HFBCH 330.

Figure 4:
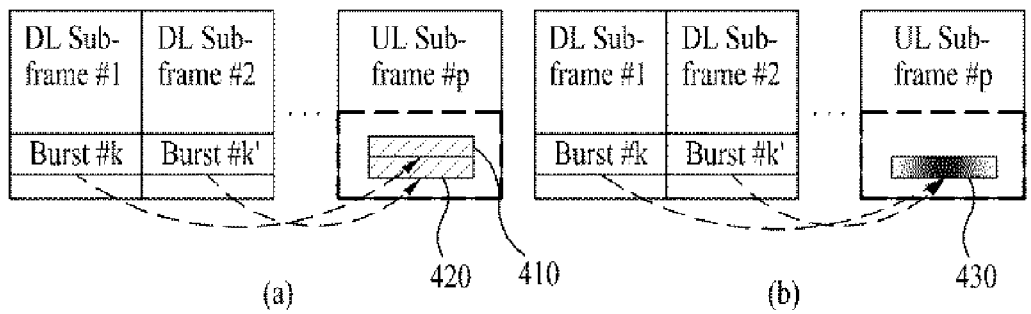
FIG. 4 illustrates an example of a frame structure used when a mobile station applies predetermined bits ? feedback to each of received downlink bursts according to the present invention.

FIG. 4 illustrates an example of a frame structure used when a mobile station applies predetermined-bits feedback to each of received downlink bursts according to the present invention.

Two or more downlink bursts may be transmitted to a mobile station through a primary carrier and a secondary carrier of a multi-carrier system. It is necessary for the mobile station to inform the base station of specific information indicating whether the primary carrier and the secondary carrier have been received without any errors. In this case, even though the mobile station informs the base station of such information indicating whether the primary carrier and the secondary carrier have been received without any errors, the mobile station may transmit a HARQ ACK/NACk feedback signal of 2 or more bits in association with only the primary carrier.

In addition, in the case where the number of downlink subframes is different from the number of subframes in one frame (for example, the ratio of the number of downlink subframe to the number of uplink subframe=5:3), it is necessary for the mobile station to transmit ACK/NACK signals of several downlink subframes to the base station through an uplink subframe. In addition, if the ratio of a Fraction Frequency Reuse (FFR) partition to an uplink FFR partition is unequal (not identical to 1:1), the mobile station may transmit ACK/NACK signals corresponding to several downlink FFR partitions to one uplink partition.

Referring to FIG. 4(a), upon receiving one downlink burst through each of the downlink subframe #1 and the downlink subframe #2, the mobile station may transmit 1-bit ACK/NACK signals of respective downlink bursts to the base station through respective HARQ feedback channels (HFBCHs) 410 and 420 included in a specific uplink subframe #p. In the meantime, as shown in FIG. 4(b), the mobile station may transmit 2-bit ACK/NACK signals of respective downlink bursts to the base station through a HARQ feedback channel (HFBCH) 430 within a specific uplink subframe #p.

As can be seen from the above description, several HARQ feedback channels (HFBCHs) may be used for 1-bit feedback, and the mobile station may separately or jointly transmit respective HARQ feedback channels (HFBCHs).

Figure 5:
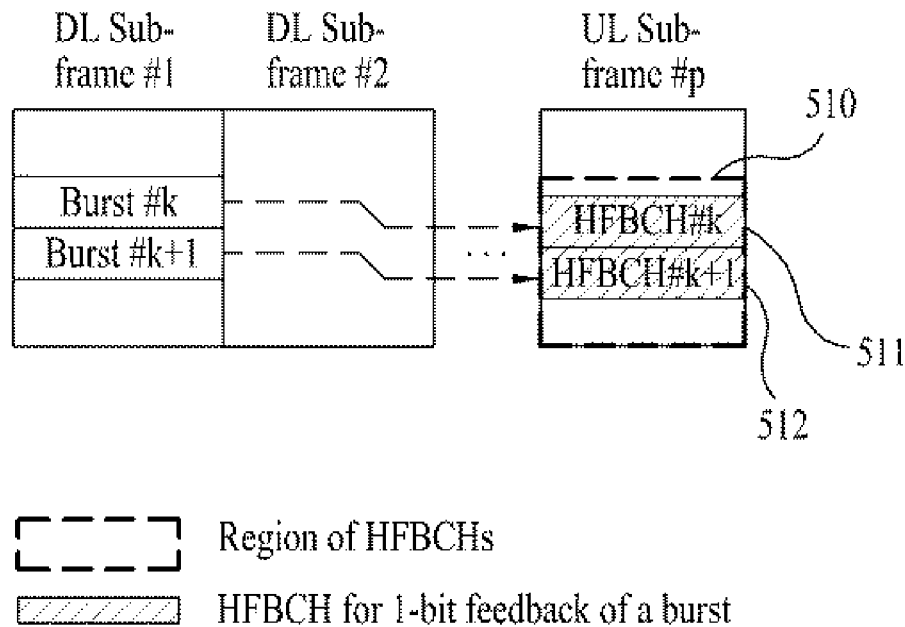
FIG. 5 illustrates an example of a frame structure used when a mobile station applies 1-bit feedback to each of received downlink bursts according to the present invention.

FIG. 5 illustrates an example of a frame structure used when a mobile station applies 1-bit feedback to each of received downlink bursts according to the present invention.

One mobile station may receive a single downlink burst from the base station. 1-bit ACK/NACK feedback related to the single downlink burst may be transmitted to the base station. An index of the allocated HARQ feedback channel (HFBCH) may be mapped to an index of the received downlink burst on a one to one basis (i.e., the ratio of 1:1).

Referring to FIG. 5, a mobile station may receive one or more downlink bursts (e.g., a downlink burst of an index #k and a downlink burst of index #k+1) through a specific downlink subframe (subframe index #1) from a base station. In this case, it is necessary for the mobile station to inform the base station of information (ACK/NACK signal) indicating whether the downlink bursts received from the base station have been received without any errors. An ACK/NACK signal of the downlink burst having the index #k may be transmitted to the base station through the HARQ feedback channel (HFBCH) 511 having the index #k, and an ACK/NACK signal of the downlink burst having the index #k+1 may be transmitted to the base station through the HARQ feedback channel (HFBCH) 512 having the index #k+1.

Figure 6:
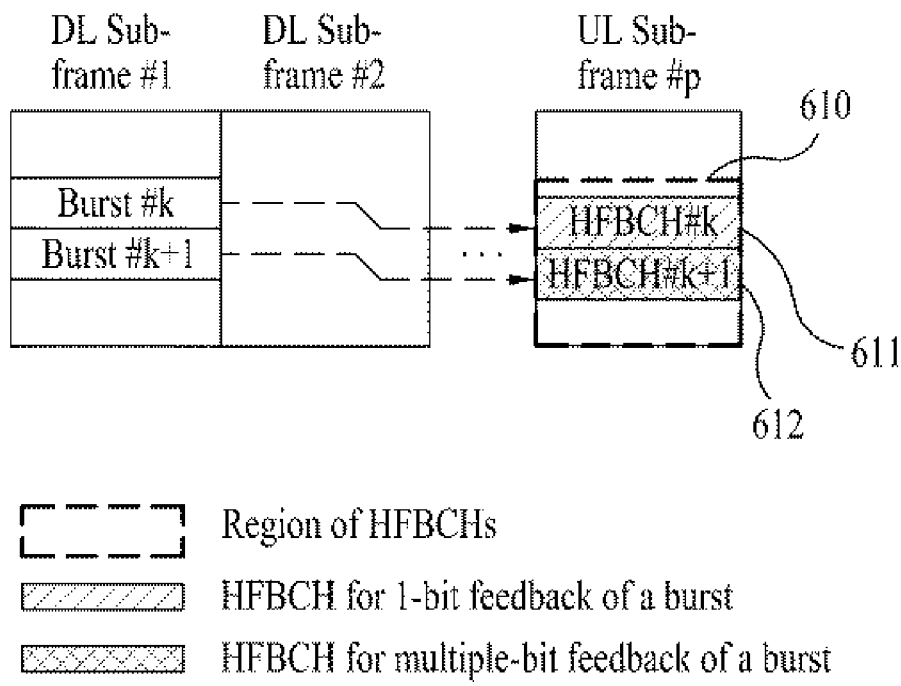
FIG. 6 illustrates an example of a frame structure used when a mobile station applies predetermined bits ? feedback to each of received downlink bursts according to the present invention.

FIG. 6 illustrates an example of a frame structure used when a mobile station applies predetermined bits ? feedback to each of received downlink bursts according to the present invention.

Each mobile station may transmit an ACK/NACK signal having the size of one bit or two or more bits to the base station. For example, after a first mobile station (mobile station 1) receives one downlink burst having an index #k through a specific downlink subframe (subframe index #1), the first mobile station may transmit a 1-bit ACK/NACK signal related to the downlink burst #k to the base station through the HARQ feedback channel (HFBCH) 611 having the index #k within a specific HARQ feedback channel (HFBCH) region 610.

In addition, a second mobile station (mobile station 2) may receive one downlink burst #k+1 from the base station through a specific downlink subframe (subframe index #1). In this case, if the downlink burst #k+1 includes multiple codewords, the second mobile station (mobile station 2) may transmit 2 or more bits—ACK/NACK signal related to the downlink burst #k+1 to the base station through the HARQ feedback channel (HFBCH) #k+1 612 within a specific HARQ feedback channel(HFBCH) region 610.

Figure 7:
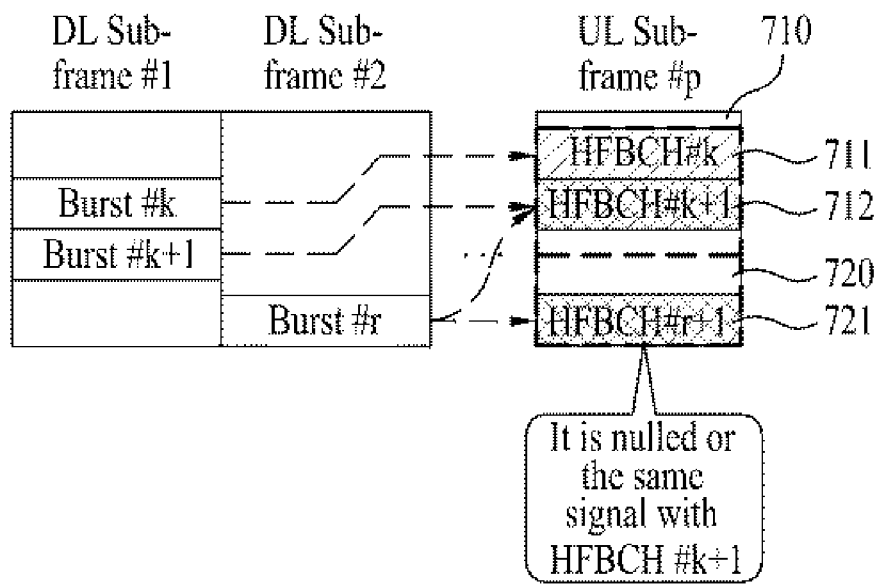
FIG. 7 illustrates an example of a frame structure used when a mobile station applies predetermined bits ? feedback to each of received downlink bursts according to the present invention.
Figure 7:
Figure 7:
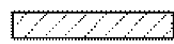
Figure 7:

FIG. 7 illustrates an example of a frame structure used when a mobile station applies predetermined-bits feedback to each of received downlink bursts according to the present invention.

As described in FIG. 6, each mobile station may transmit an ACK/NACK signal having the size of 1 bit or at least 2 bits to the base station. For example, after a first mobile station (mobile station 1) receives one downlink burst having an index #k through a specific downlink subframe (subframe index #1), the first mobile station may transmit a 1-bit ACK/NACK signal related to the downlink burst #k to the base station through the HARQ feedback channel (HFBCH) 711 having the index #k within a specific HARQ feedback channel (HFBCH) region 710.

Referring to FIG. 7, the mobile station 2 may respectively receive a downlink burst #k+1 and a downlink burst #r from the base station through specific downlink subframes (i.e., a subframe index #1 and a subframe index #2). In this case, the second mobile station 2 may transmit an 2-bit ACK/NACK signal related to the received two downlink bursts to the base station through the HARQ feedback channel (HFBCH) #k+1 712 within a specific HARQ feedback channel (HFBCH) region 710. In other words, the mobile station 2 may transmit an ACK/NACK signal related to the downlink burst #r received from the downlink subframe #2 to the base station through the HARQ feedback channel (HFBCH) #k+1 712 instead of the HARQ feedback channel (HFBCH) region 713. Therefore, the HARQ feedback channel (HFBCH) #r 713 may be nulled. Optionally, the mobile station 2 may repeatedly transmit the ACK/NACK signal transmitted via the HARQ feedback channel (HFBCH) #k+1 712 to the base station through the HARQ feedback channel (HFBCH) #r 713.

Next, a HARQ feedback channel (HFBCH) structure having either the size of one bit or the size of two or more bits will hereinafter be described.

Figure 8:
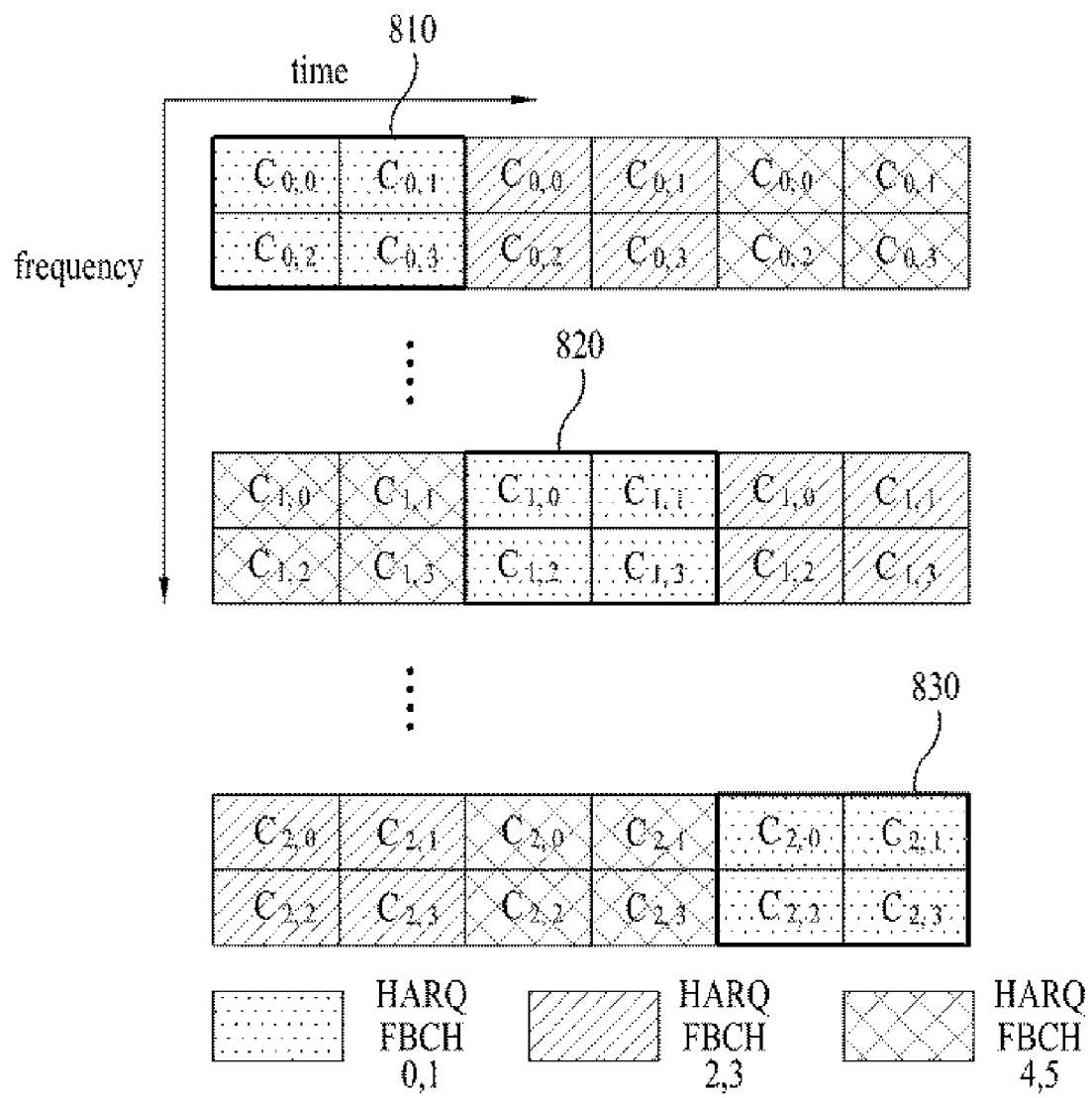
FIG. 8 illustrates an example of a HARQ Mini Tile (HMT) structure to which a HARQ feedback channel (HFBCH) is allocated according to the present invention.

FIG. 8 illustrates an example of a HARQ Mini Tile (HMT) structure to which a HARQ feedback channel (HFBCH) is allocated according to the present invention.

Referring to FIG. 8, HARQ feedback control channel resources of three Reordered Feedback Mini Tiles (RFMTs) can be further divided into 9 HARQ Mini Tiles (HMTs). In this case, each HMT may include two contiguous may include two OFDM symbols on a time axis and two contiguous subcarriers on a frequency axis.

One pair of HARQ feedback channels (HFBCHs) may include a HARQ feedback channel (HFBCH) transmitted from the first mobile station 1 and a HARQ feedback channel (HFBCH) transmitted from the second mobile station 2. In other words, the first mobile station 1 may feed back a 1-bit ACK/NACK signal to the base station through a first HARQ feedback channel (HFBCH), and the second mobile station 2 may feed back a 1-bit ACK/NACK signal to the base station through a second HARQ feedback channel (HFBCH). One pair of HARQ feedback channels (HFBCHs) for such 1-bit feedbacks of the first and second mobile station 1 and 2 may be allocated to a HARQ Mini Tiles (HMT) that includes two contiguous OFDM symbols on a time axis and two contiguous subcarriers on a frequency axis. Different orthogonal sequences for 1-bit feedbacks of the first and second mobile stations 1 and 2 may be CDM (Code Division Multiplexing) ? processed within the HMT.

One pair of HARQ feedback channels (HFBCHs) may be allocated to three HMTs. For example, a first HARQ feedback channel (HFBCH) of the first mobile station 1 and a second HARQ feedback channel (HFBCH) of the second mobile station 2 may be allocated to each of the three HMT regions 810, 820, and 830. Respective 1-bit ACK/NACK signals of the first HARQ feedback channel (HFBCH) of the first mobile station 1 and the second HARQ feedback channel (HFBCH) of the second mobile station 2 are CDM-processed using orthogonal sequences, so that the CDM-processed ACK/NACK signals may be respectively allocated to each of three HMT regions 820, 820 and 830. In this case, an exemplary orthogonal sequence is shown in Table 1, the exemplary orthogonal sequence being used when the first mobile station performs 1-bit feedback via the first HARQ feedback channel (HFBCH) and performs 1-bit feedback via the second HARQ feedback channel (HFBCH). Table 1 illustrates sequences of the HARQ feedback and their mapping examples.

TABLE 1

| Orthogonal sequence | 1-bit feedback |
| --- | --- |
| [+1 +1 +1 +1] | First channel ACK |
| [+1 −1 +1 −1] | First channel NACK |
| [+1 +1 −1 −1] | Second channel ACK |
| [+1 −1 −1 +1] | Second channel NACK |

Referring to Table 1, the orthogonal sequence may be mapped in each HMT to form a HARQ feedback channel (HFBCH). Each group of three RFMTs may support 6 HARQ feedback channels (HFBCHs). Each HARQ feedback channel (HFBCH) may transmit 1-bit HARQ feedback. In order to transmit ACK or NACK feedback of each HARQ feedback channel (HFBCH), two orthogonal sequences may be used. Therefore, four different orthogonal sequences are required for ACK or NACK feedback transmission of two HARQ feedback channels (HFBCHs). The mobile station 1 may use a first HARQ feedback channel (HFBCH) for 1-bit feedback. The mobile station 2 may use a second HARQ feedback channel (HFBCH) for 1-bit feedback.

For example, the mobile station 1 may use an orthogonal sequence [+1 −1 +1 −1] for 1-bit NACK feedback, the mobile station 2 may use an orthogonal sequence [+1 +1 −1 −1] for 1-bit ACK feedback. Allocation of the two orthogonal sequences may be achieved by applying the CDM scheme to HMTs 810, 820 and 830.

The following Table 2 illustrates sequences of 2-bit feedback and their mapping examples.

TABLE 2

| Orthogonal Sequence | 2-bit feedback |
| --- | --- |
| [+1 +1 +1 +1] | First-bit ACK of First-channel |
| [+1 −1 +1 −1] | First-bit NACK of First-channel |
| [+1 +1 −1 −1] | Second-bit ACK of First-channel |
| [+1 −1 −1 +1] | Second-bit NACK of First-channel |

A mobile station 1 may receive one downlink burst including two codewords or two downlink bursts from the base station. If it is assumed that the mobile station 1 receives a single downlink burst including two codewords from the base station, in order to implement ACK/NACK feedback associated with the single downlink burst, the mobile station 1 may perform 2-bit feedback of each of ACK/NACK signals corresponding to respective codewords such that the 2-bit feedback result is transmitted to the base station. For example, the mobile station 1 may transmit ACK in a first bit in relation to a first codeword and transmit NACK in a second bit in relation to a second codeword. As can be seen from Table 2, the mobile station 1 may transmit ACK/NACK feedback to the base station using two orthogonal sequences [+1 +1 +1 +1] and [+1 −1 −1 +1].

The orthogonal sequences and the mapping shown in Table 2 illustrate that one mobile station (e.g., mobile station 1) performs 2-bit feedback through one HARQ feedback channel (HFBCH) (e.g., a first HFBCH). As a result, in this case, it is necessary for each HARQ feedback channel (HFBCH) to be indexed.

Since the mobile station 1 has to transmit two HARQ feedback channels (HFBCHs) to the base station through HMTs 810, 820 and 830, the half of power is allocated to each HARQ feedback channel (HFBCH).

The following Table 3 illustrates sequences of 2-bit feedback and their mapping examples.

TABLE 3

| Orthogonal Sequence | 2-bit feedback |
| --- | --- |
| [+1 +1 +1 +1] | First Channel ACK/ACK |
| [+1 −1 +1 −1] | First Channel ACK/NACK |
| [+1 +1 −1 −1] | First Channel NACK/ACK |
| [+1 −1 −1 +1] | First Channel NACK/NACK |

A first mobile station 1 may receive one downlink burst including two codewords or two downlink bursts from the base station. If it is assumed that the mobile station 1 receives a single downlink burst including two codewords from the base station, in order to transmit ACK/NACK feedback related to the single downlink burst, the mobile station 1 may perform 2-bit feedback of each of ACK/NACK signals corresponding to respective codewords such that the 2-bit feedback result is transmitted to the base station. For example, the mobile station 1 may transmit ACK in a first bit in relation to a first codeword and transmit NACK in a second bit in relation to a second codeword. As can be seen from Table 3, the mobile station 1 may transmit ACK/NACK feedback to the base station using one orthogonal sequence [+1 +1 −1 −1].

The orthogonal sequences and the mapping shown in Table 3 illustrate that one mobile station (e.g., first mobile station 1) performs 2-bit feedback through one HARQ feedback channel (HFBCH) (e.g., a first HFBCH). Therefore, a mobile station 2 may perform 2-bit feedback through the second HFBCH. Therefore, in this case, it is necessary for each HARQ feedback channel (HFBCH) to be indexed.

Since each mobile station transmits one HARQ feedback channel (HFBCH) to the base station through HMTs 810, 820 and 830, the entire power can be allocated to each HARQ feedback channel (HFBCH).

The following Table 4 illustrates sequences of 2-bit feedback and their mapping examples.

TABLE 4

| Sequence Index | Orthogonal Sequence | 2-bit feedback |
| --- | --- | --- |
| 0 | [+1 +1 +1 +1] | Even numbered channel ACK/ACK |
| 1 | [+1 +j +1 +j] | Even numbered channel ACK/NACK |
| 2 | [+1 −1 +1 −1] | Even numbered channel NACK/ACK |
| 3 | [+1 −j +1 −j] | Even numbered channel NACK/NACK |
| 4 | [+1 +1 −1 −1] | Odd numbered channel ACK/ACK |
| 5 | [+1 +j −1 −j] | Odd numbered channel ACK/NACK |

TABLE 4-continued

| Sequence Index | Orthogonal Sequence | 2-bit feedback |
|---|---|---|
| 6 | [+1 −1 −1 +1] | Odd numbered channel NACK/ACK |
| 7 | [+1 −j −1 +j] | Odd numbered channel NACK/NACK |

Each mobile station (e.g., a mobile station 1 or a mobile station 2) may receive one downlink burst including two codewords or two downlink bursts from the base station.

If it is assumed that the mobile station 1 receives a single downlink burst including two codewords from the base station, in order to transmit ACK/NACK feedback related to the single downlink burst, the mobile station 1 may perform 2-bit feedback of each of ACK/NACK signals corresponding to respective codewords such that the 2-bit feedback result is transmitted to the base station. In contrast, if the mobile station 1 receives two downlink bursts from the base station, the mobile station 1 may transmit 2-bit feedback related to downlink bursts to the base station. Each mobile station needs to transmit ACK/NACK feedback to the base station according to individual downlink bursts or individual codewords included in one downlink burst. The following description is made on the assumption that each of the first mobile station 1 and the second mobile station 2 receives one downlink burst including two codewords.

In the case where the mobile station 1 attempts to respectively feed back ACK and NACK signals to first and second codewords of the first downlink burst using the first HARQ feedback channel (HFBCH), the mobile station 1 may feed back such ACK/NACK signals to the base station using the orthogonal sequence [+1 +j +1 +j] shown in Table 4. In the case where the second mobile station 2 attempts to respectively feed back NACK and ACK signals to first and second codewords of the second downlink burst using the second HARQ feedback channel (HFBCH), the second mobile station 2 may use the orthogonal sequence [+1 −1 −1 +1] shown in Table 4. Allocation of the two orthogonal sequences may be achieved by applying the CDM scheme to HMTs 810, 820 and 830.

Each mobile station transmits 2-bit feedback to the base station through one HARQ feedback channel (HFBCH), such that it can fully use the entire power allocated to the HMT in association with one HARQ feedback channel (HFBCH). Each mobile station is able to use one HARQ feedback channel (HFBCH) by applying QPSK modulation to even-indexed sequences.

In this case, the number of downlink grant signals received in each mobile station may be one-to-one mapped to HARQ feedback channels (HFBCHs). That is, the ratio of the number of downlink grant signals to HARQ feedback channels may be set to 1:1.

Figure 9:
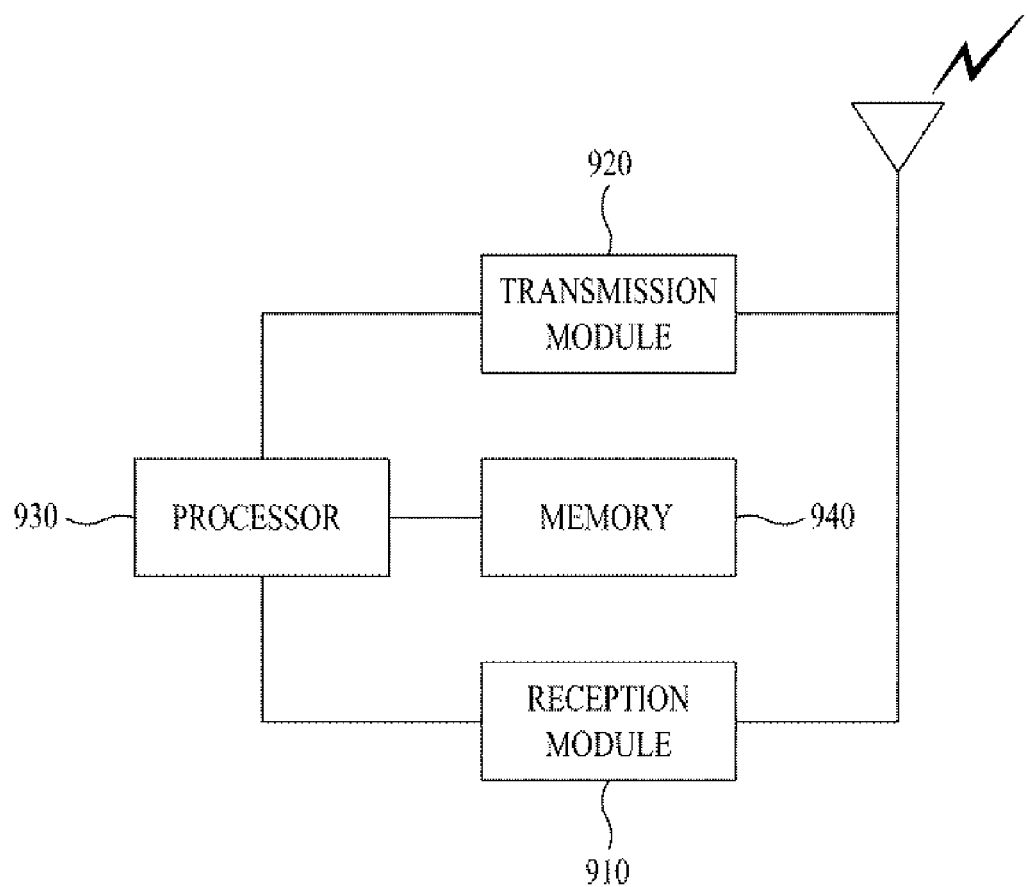
FIG. 9 illustrates a mobile station according to the present invention.

FIG. 9 illustrates a mobile station according to the present invention.

Referring to FIG. 9, the mobile station may include a reception module 910, a transmission module 920, a processor 930, and a memory 940.

The reception module 910 may receive a variety of data or information from an external part such as a base station. Specifically, the reception module 910 may receive two downlink bursts or one downlink burst including two codewords from the base station. The transmission module 920 may transmit a variety of signals, data, information, etc. to the base station and the like. Specifically, the transmission module 920 transmits an ACK/NACK feedback corresponding to each downlink burst of the received two downlink bursts or each codeword of the received one downlink burst including the two codewords to the base station. In this case, an orthogonal sequence is applied to the ACK/NACK feedback of the mobile station so that the resultant ACK/NACK feedback is transmitted via a first HARQ feedback channel (HFBCH) included in a single HARQ mini tile (HMT).

The processor 930 may arithmetically perform processing of information received in the mobile station. The memory 940 may store arithmetically-processed information, reception information, etc. for a predetermined time, and be replaced with any of other constituent elements such as a buffer (not shown).

Figure 10:
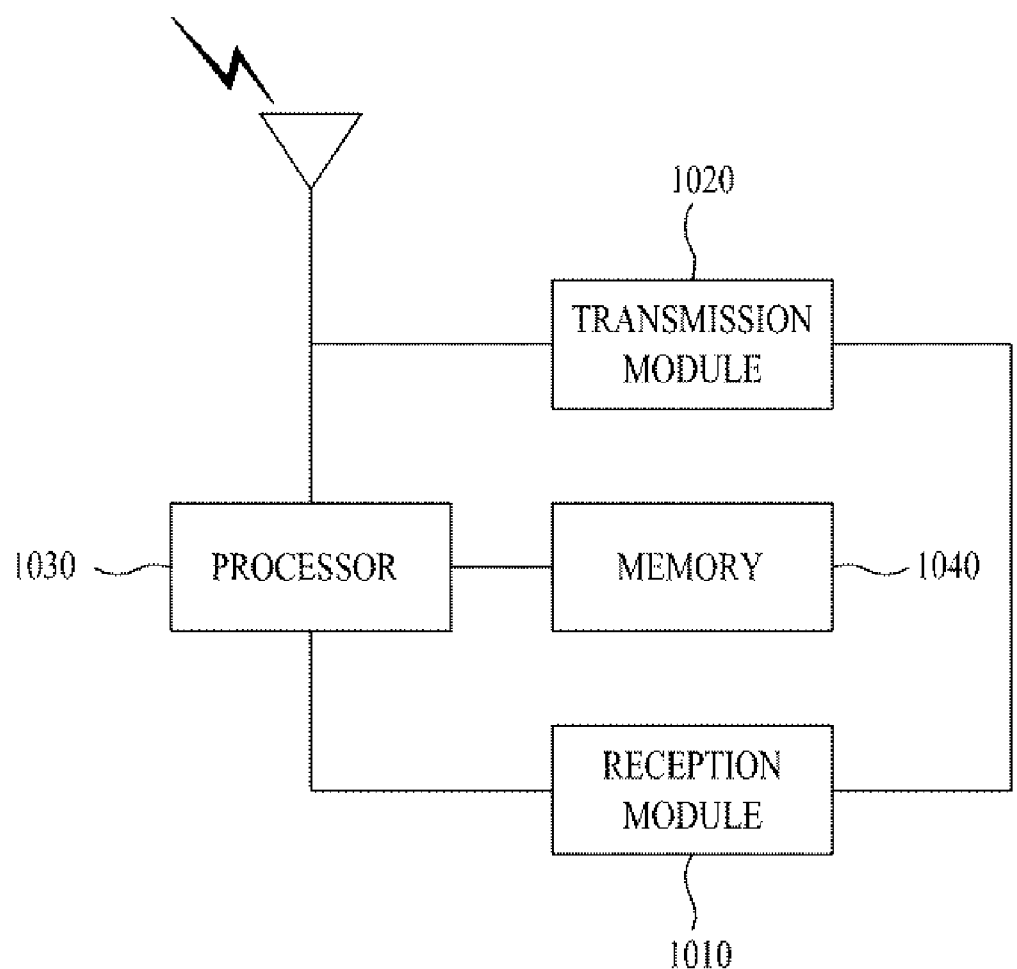
FIG. 10 illustrates a base station according to the present invention.

FIG. 10 illustrates a base station according to the present invention.

Referring to FIG. 10, the base station may include a reception module 1010, a transmission module 1020, a processor 1030, and a memory 1040.

In FIG. 10, the transmission module 1020 may transmit a variety of signals, data, information, etc. to the base station and the like. Specifically, the transmission module 1020 may transmit two downlink bursts or one downlink burst including two codewords to each of the first and second mobile stations. The reception module 1010 may receive a variety of data or information from an external part such as a mobile station. Specifically, the reception module 1010 may receive an ACK/NACK signal corresponding to each downlink burst of the two downlink bursts transmitted from the transmission module 1020 or each codeword of the transmitted one downlink burst including the two codewords from each of the first mobile station 1 and the second mobile station 2. In this case, different orthogonal sequences (that is, first and second orthogonal sequences) are applied to the ACK/NACK signals of the first and second mobile stations, so that the resultant ACK/NACK may be transmitted via different HFBCHs (that is, first and second HFBCHs) included in one HMT.

The processor 1030 may arithmetically perform processing of information received in the base station. The memory 1040 may store arithmetically-processed information, reception information, etc. for a predetermined time, and be replaced with any of other constituent elements such as a buffer (not shown).

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

As apparent from the above description, according to a first method for transmitting HARQ feedback of 2 bits (i.e., 2-bit HARQ feedback), each mobile station can use the entirety of power allocated to one HARQ feedback channel (HFBCH), such that the accuracy of HARQ feedback transmission can be increased and communication performance or throughput can also be improved.

In addition, compared with a second method for transmitting HARQ feedback of one bit (i.e., 1-bit HARQ feedback), the above-mentioned first method for transmitting 2-bit HARQ feedback maintains the same capacity as in the second method, and uses the same indexing rule as in the second method, resulting in no indication overhead.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Industrial Applicability

The method of transmitting and receiving HARQ ACK/NACK feedback may be applied to IEEE 802.16m, 3GPP LTE system and like that.

The invention claimed is:

1. A method for transmitting a hybrid automatic repeat request (HARQ) feedback at a mobile station (MS) in a wireless communication system, the method comprising:
receiving one downlink burst including two codewords or two downlink bursts from a base station (BS); and
transmitting acknowledgement (ACK) or negative acknowledgement (NACK) feedbacks corresponding to each downlink burst of the two downlink bursts or each of the two codewords included in the one downlink burst, to the base station,
wherein an orthogonal sequence is mapped to each HARQ mini tile (HMT) to form HARQ feedback channels and the ACK or NACK feedbacks are transmitted via a first HARQ feedback channel (HFBCH) included in a single HARQ mini tile (HMT),
wherein the first HARQ feedback channel (HFBCH) and a second HARQ feedback channel (HFBCH) for ACK or NACK feedbacks transmission of another mobile station are included in the single HARQ mini tile (HMT), and are transmitted to the base station,
wherein the first and the second HARQ feedback channels (HFBCHs) are transmitted on each of three HARQ mini tiles (HMTs), and
wherein each of the three HARQ mini tiles (HMTs) is arranged in such a manner that a time region and a frequency region are not overlapped with each other.

2. The method according to claim 1, wherein the single HARQ mini tile (HMT) consists of two orthogonal frequency division multiplexing (OFDM) symbols by two subcarriers.

3. The method according to claim 1, wherein the mobile station and another mobile station respectively use a first orthogonal sequence and a second orthogonal sequence for ACK or NACK feedbacks transmission,
wherein a code division multiplexing (CDM) scheme is used to multiplex the first and second HARQ feedback channels in the single HARQ mini tile (HMT).

4. The method according to claim 1, wherein each of the mobile station and another mobile station transmit ACK or NACK feedbacks having the size of 2 bits to the base station.

5. A method for receiving a hybrid automatic repeat request (HARQ) feedback at a base station (BS) in a wireless communication system, the method comprising:
transmitting, by the base station, one downlink burst including two codewords or two downlink bursts to each of a first and a second mobile station; and
receiving acknowledgement (ACK) or negative acknowledgement (NACK) feedbacks corresponding to each downlink burst of the transmitted two downlink bursts or each of the two codewords included in the one downlink burst, from each of the first and second mobile stations,
wherein different orthogonal sequences are mapped to each HARM mini tile (HMT) to form HARQ feedback channels, and the ACK or NACK feedbacks are transmitted via different HARQ feedback channels (a first HARQ feedback channel and a second HARQ feedback channel) included in a single HARQ mini tile (HMT),
wherein the first and the second HARQ feedback channels (HFBCHs) are received on each of three HARQ mini tiles (HMTs), and
wherein each of the three HARQ mini tiles (HMTs) is arranged in such a manner that a time region and a frequency region are not overlapped with each other.

6. The method according to claim 5, wherein the single HARQ mini tile (HMT) consists of two orthogonal frequency division multiplexing (OFDM) symbols by two subcarriers.

7. The method according to claim 5, wherein a code division multiplexing (CDM) scheme is used to multiplex the first and second HARQ feedback channels in the single HARQ mini tile (HMT).

8. The method according to claim 5, wherein the ACK or NACK feedbacks of each of the first and second mobile stations has the size of 2 bits.

* * * * *